United States Patent [19]

Cain

[11] 4,314,417
[45] Feb. 9, 1982

[54] MOTOR VEHICLE REGISTRATION PLATE HOLDER

[75] Inventor: James T. Cain, Krugersdorp, South Africa

[73] Assignee: JNPC Investments (Proprietary) Limited, Randburg, South Africa

[21] Appl. No.: 58,807

[22] Filed: Jul. 19, 1979

[30] Foreign Application Priority Data

Jul. 25, 1978 [ZA] South Africa ............... 78/4230

[51] Int. Cl.³ .................. G09F 7/00; B60R 13/10
[52] U.S. Cl. ...................... 40/209; 40/10 R; 40/152
[58] Field of Search ........... 40/200, 201, 202, 209, 40/152, 156, 158 R, 2 R, 10 R

[56] References Cited

U.S. PATENT DOCUMENTS

| | | | |
|---|---|---|---|
| 1,471,164 | 10/1923 | Impol | 40/209 |
| 1,568,907 | 1/1926 | Mytko | 40/202 |
| 1,995,984 | 3/1935 | Hudson | 40/209 |
| 2,098,432 | 11/1937 | Roose | 40/209 X |
| 2,140,067 | 12/1938 | Batcheller | 40/209 |
| 2,171,713 | 9/1939 | Roose | 40/209 X |
| 2,361,479 | 10/1944 | Joffo | 40/10 R |
| 2,709,314 | 5/1955 | Allen | 40/209 X |
| 2,797,513 | 7/1957 | Edwards | 40/209 |
| 2,827,722 | 3/1958 | Leclerc | 40/209 |
| 2,910,793 | 11/1959 | Helmer | 40/209 |
| 3,173,219 | 3/1965 | Yarder | 40/209 |
| 3,304,642 | 2/1967 | Dardis | 40/209 |
| 3,314,181 | 4/1967 | Bauer | 40/209 |
| 3,315,394 | 4/1967 | Kluck | 40/209 |

Primary Examiner—Gene Mancene
Assistant Examiner—G. Lee Skillington
Attorney, Agent, or Firm—Finnegan, Henderson, Farabow, Garrett & Dunner

[57] ABSTRACT

This invention relates to a holder for motor vehicle registration plates and consists of a backing member which is adapted for attachment to a motor vehicle and a frame made from a plastics material which covers the periphery of the registration plate when located on the holder and includes a first formation adapted to bear on the periphery of the plate and a plurality of second formations which by resilient transverse deformation of the frame are engageable with the underside of the backing member to lock the plate between the backing member and frame.

4 Claims, 4 Drawing Figures

U.S. Patent
Feb. 9, 1982
4,314,417
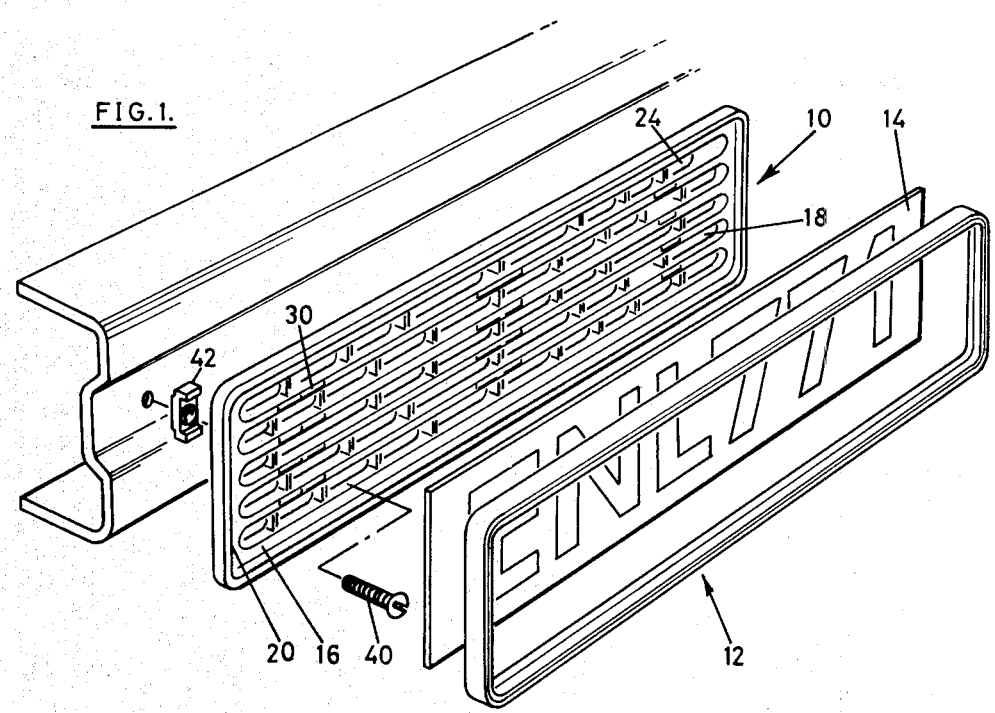
FIG. 1.
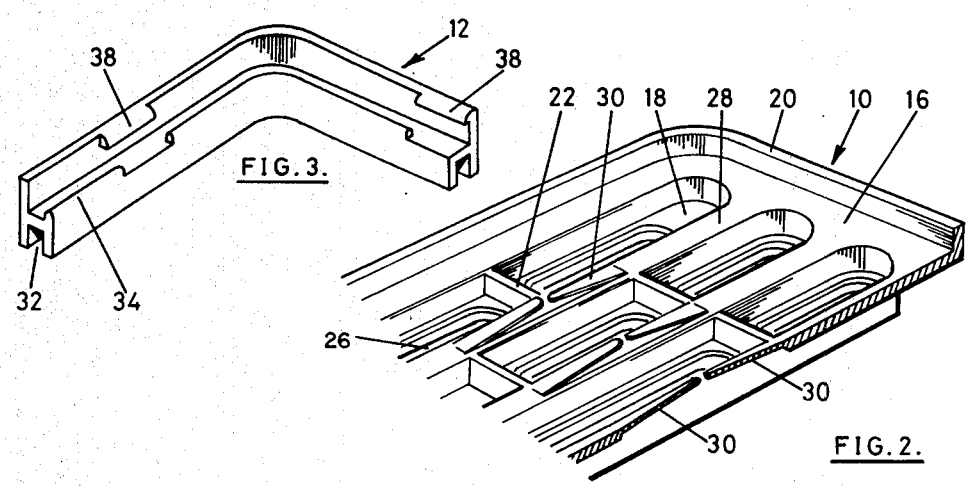
FIG. 3.
FIG. 2.
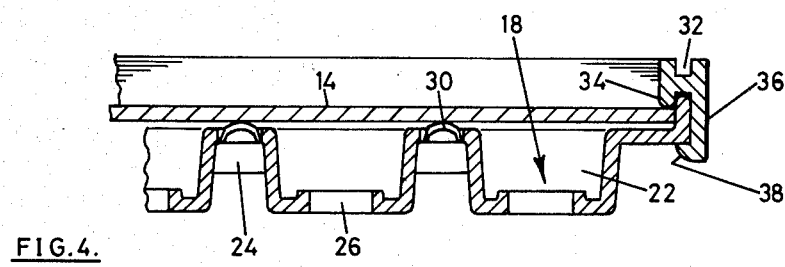
FIG. 4.

U.S. Patent
Feb. 9, 1982
4,314,417
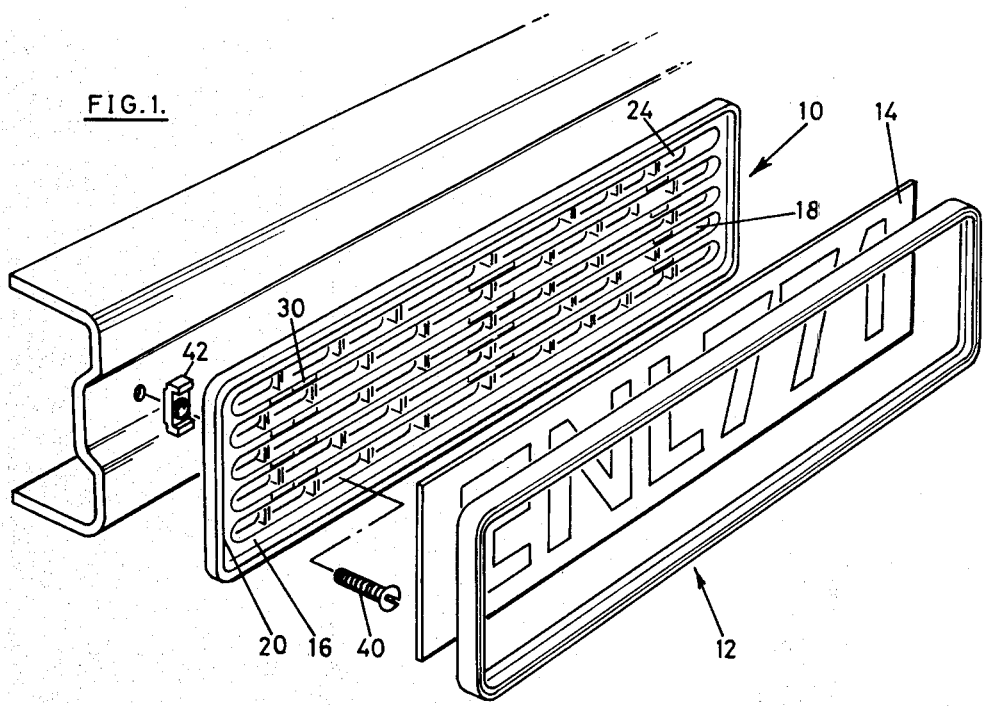
FIG.1.
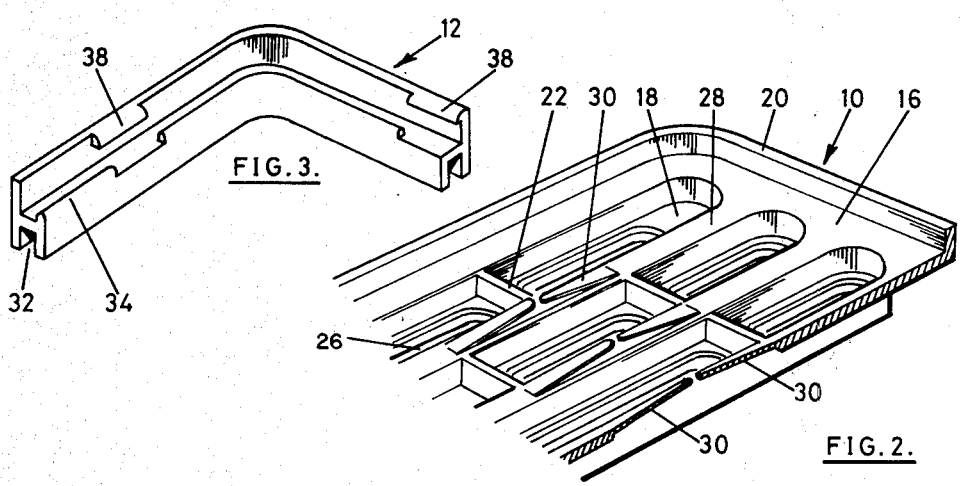
FIG.3.
FIG.2.
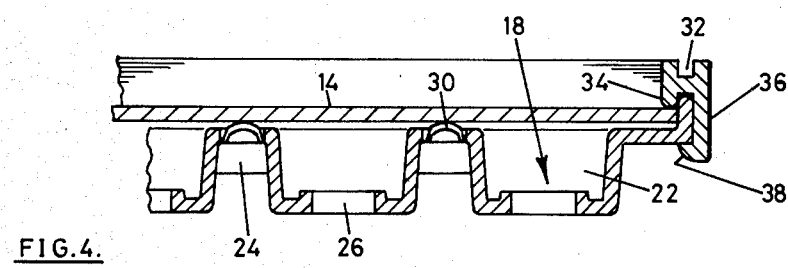
FIG.4.

MOTOR VEHICLE REGISTRATION PLATE HOLDER

FIELD OF THE INVENTION

This invention relates to a holder for attaching a registration plate to a motor vehicle or the like.

BACKGROUND TO THE INVENTION

Motor vehicle registration plate holders which include a backing member and frame between which the registration plate is located in use are known. The backing members and frames of the holders are made from pressed sheet metal or metal components which are welded or riveted together. The holders additionally generally include resilient rubber or like inserts to hold the plates in the holders against rattling and often an elaborate system for attaching the backing member to a motor vehicle. In some cases the frames are fixed to the backing member and have an opening in one side through which the plate is slid into the holder and others include a separate frame which is hinged to one side of the backing member and fastened to the opposite side or alternatively, clipped to two opposite sides to hold the plate in position in the holder. Problems with holders of the above type are that they are labor intensive to manufacture and include many components and are therefore expensive and more importantly it is a simple matter to remove the plates from the holders.

OBJECT OF THE INVENTION

It is the object of this invention to provide a motor vehicle registration plate holder which is relatively inexpensive and tamper proof.

SUMMARY OF THE INVENTION

A motor vehicle registration plate holder according to the invention includes a rectangular backing member which is adapted for attachment to a motor vehicle, and a removable frame member characterized in that the frame member is made from a plastics material, dimensioned to cover the periphery of a registration plate located on the backing member and includes an integral first formation which is adapted to bear on the front face of the plate and at least one second formation which is by resilient deformation of the frame member engageable with a formation on the underside of the backing member to lock the registration plate between the frame and backing member. Conveniently, the holder includes resilient means for biasing a registration plate located between the backing member and frame into engagement with either the backing member or frame.

In a preferred form of the invention the backing member is made from a resilient plastics material and the plate biasing means are formations which are integral with the backing member and project from the plate supporting member to provide resilient springs for biasing a plate supported on the supporting member into contact with the clip in use. The backing member may additionally include an upstanding peripheral rim which surrounds the periphery of the plate and projects above the outer surface of the plate in use with the or each first formation on the frame member in use bearing on the periphery of the plate on one side of the rim and the or each second formation passing over the other side of the rim to be engaged with a formation on the underside of the rim.

Further according to the invention the or each second formation on the frame member is attached to a continuous skirt on the frame member which covers the rim on the backing member in use.

BRIEF DESCRIPTION OF THE DRAWINGS

An embodiment of the invention will now be described by way of example with reference to the drawings in which:

FIG. 1 is an exploded view of the registration plate holder of the invention in use, FIG. 2 is a fragmentary section view of a corner of the backing member of the holder of FIG. 1, FIG. 3 is a fragmentary section view of the underside of a corner of the frame for holding a registration plate to the backing member of the holder, and FIG. 4 is a transversely sectioned fragmentary side elevation of the assembled holder of the invention.

DETAILED DESCRIPTION OF THE INVENTION

The registration plate holder of the invention is shown in FIG. 1 of the drawings to consist essentially of a backing member 10 and a frame member 12 for holding a registration plate 14 to the backing member. Both the backing member 10 and the frame 12 are made from a fairly rigid yet resilient impact and weather resistant plastics material such as acroylonitrite butadiene styrene.

The backing member, as is more clearly seen in FIGS. 2 and 4, consists of a dish shaped molding which includes a base 16, a plurality of elongated recesses 18 in the base and an upstanding rim 20. The recesses 18 are divided over their lengths into compartments by stiffening ribs 22. Similar stiffening ribs 24 are located on the underside of the base member between the recesses 18 to stiffen the backing member against bending in a transverse direction. The bases of the compartments in the recesses 18 carry elongated slots 26.

The elongated portions 28 of the base 16 each carry a plurality of upwardly directed tongues 30 which are pressed and separated from the material of the base member along two sides and across one end to provide resilient springs adapted to bear on the plate 14 in use.

The frame 12 is shaped in cross section as illustrated in FIGS. 3 and 4 and includes an outer groove 32, a substantially continuous formation 34, a decoratively finished side member 36 and a plurality of spaced inwardly directed locking formations 38. The formation 34 is interrupted immediately above the locking formations 38 to lessen the rigidity of the molding in the regions of the formations 38.

In use, and referring again to FIG. 1, the backing member 10 is attached to a motor vehicle fender by means of headed screws 40 which are passed through the slots 26 in the base member to be bolted to the vehicle fender or a suitable position on the vehicle bodywork. The heads of the screws 40 are, when the backing member is fixed, located fully in the recesses 18 well below the upper surface of the base 16. If necessary, suitable spacers 42 which are grooved to embrace the outer bases of the recesses 18 may be employed to locate the backing member in position on the vehicle.

With the backing member located on the vehicle, the plate is located on the base 16 of the backing member against the bias of the springs 30. The frame 12 is now pressed downwardly on the rim 20 of the body member. The formations 38 will cause outward deflection of the side member 36 against the resilience of the material of the frame as the frame is being pushed over the rim of the backing member until the members 38 clear the lower edge of the rim 20 and then snap into the position illustrated in FIG. 4 to lock the clip to the base member. The formation 34 on the frame in this position bears on the plate 14 and forces the plate towards the base 16 of the base member against the bias of the springs 30. The bias of the springs 30 ensure positive location of the plate 14 between the base member 10 and the frame 12 to prevent movement and so rattling of the plate when in position.

The frame 12 is described above and illustrated in the drawings to include locking formations 38 on both the long and short sides of the frame and with this arrangement of the formations 38 and a sufficiently rigid material the frame is for practical purposes permanently located on the backing member once engaged. To make the frame removable without substantial damage the formations 38 on the short edges of the frame may be omitted to permit a greater degree of flexibility of the frame for removal from the base member. If it is desired, for security reasons, to make a frame specific to a particular backing member a locating key and groove arrangement may be provided on the frame and backing member so that a frame not having the key or groove in a particular position will not be engageable with a backing member which does not carry the complemental formation in a position in which the formations are in register.

A further security arrangement that could be employed with the plate holder of the invention is to provide one or more upstanding bosses in the recesses 18 with bores through the bosses which carry teeth like formations for permanent non-releasable engagement with similar formations on headed studs which are passed through suitably positioned holes in the plates. The heads of the studs could be provided with a seal impression which is not easily duplicated so that a missing seal would indicate a tampered with plate holder.

The invention is not limited to the precise constructional details as herein described and, for example, with the advent of vehicle fenders which are molded from plastics materials the base member 10 could be made integral with the fender. Additionally, the frame 12 may include an inwardly directed groove adjacent the formation 34 in which a transparent plastics cover for the plate may be engaged. Alternatively, the entire frame including the cover could be made from a suitable transparent plastics material.

I claim:

1. A motor vehicle registration plate holder including a rectangular backing member which is adapted for attachment to a motor vehicle, and a removable frame member which is made from a plastics material and which is dimensioned to cover the periphery of a registration plate located on the backing member, the frame member including at least one formation which in use of the holder bears on the front face of the plate and at least one locking formation which is by resilient deformation of the frame member engageable with the backing member to lock the registration plate between the frame and backing member, the backing member being made from a resilient plastics material and including integrally molded resilient formations which in use of the holder bias the registration plate into contact with the frame member.

2. A motor vehicle registration plate holder including a rectangular backing member which is adapted for attachment to a motor vehicle, and a removable frame member which is made from a plastics material and which is dimensioned to cover the periphery of a registration plate located on the backing member, the frame member including at least one formation which in use of the holder bears on the front face of the plate and at least one locking formation which is by resilient deformation of the frame member engageable with the backing member to lock the registration plate between the frame and backing member, the backing member including a surface on which the plate is supported and recessed zones in the surface, at least some of the recessed zones including slots which are elongated in the horizontal direction of the holder in use and through which pass fastening means for securing the backing member to a motor vehicle.

3. A motor vehicle registration plate holder including a rectangular backing member which is adapted for attachment to a motor vehicle, and a removable frame member which is made from a plastics material and which is dimensioned to cover the periphery of a registration plate located on the backing member, the frame member including at least one formation which in use of the holder bears on the front face of the plate and at least one locking formation which is by resilient deformation of the frame member engageable with the backing member to lock the registration plate between the frame and backing member, the backing member including an upstanding peripheral rim which surrounds the periphery of the plate and projects above the outer surface of the plate in use with each formation on the frame member in use bearing on the periphery of the plate on one side of the rim and each locking formation passing over the other side of the rim to be engaged with the underside of the backing member.

4. A plate holder as claimed in claim 3 in which each locking formation on the frame member is attached to a continuous skirt on the frame which covers the rim on the backing member in use.

* * * * *

UNITED STATES PATENT AND TRADEMARK OFFICE
CERTIFICATE OF CORRECTION

PATENT NO. : 4,314,417
DATED : February 9, 1982
INVENTOR(S) : James T. Cain

It is certified that error appears in the above-identified patent and that said Letters Patent are hereby corrected as shown below:

Column 4, line 54, after "frame" and before "which" insert --member--.

Signed and Sealed this

Twentieth Day of April 1982

[SEAL]

Attest:

Attesting Officer

GERALD J. MOSSINGHOFF

Commissioner of Patents and Trademarks